US009879354B2

(12) United States Patent
Joy et al.

(10) Patent No.: US 9,879,354 B2
(45) Date of Patent: Jan. 30, 2018

(54) ELECTROCHEMICAL PROCESS FOR WATER SPLITTING USING POROUS $CO_3O_4$ NANORODS

(71) Applicant: Council of Scientific and Industrial Research, New Delhi (IN)

(72) Inventors: Pattayil Alias Joy, Pune (IN); Vijayamohanan Kunjukrishna Pillai, Pune (IN); Ramasundar Mohan Rani, Pune (IN); Joyashish Debgupta, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 301 days.

(21) Appl. No.: 14/397,058

(22) PCT Filed: Apr. 25, 2013

(86) PCT No.: PCT/IN2013/000279
§ 371 (c)(1),
(2) Date: Oct. 24, 2014

(87) PCT Pub. No.: WO2013/160915
PCT Pub. Date: Oct. 31, 2013

(65) Prior Publication Data
US 2015/0136614 A1    May 21, 2015

(30) Foreign Application Priority Data

Apr. 25, 2012    (IN) .......................... 1273/DEL/2012

(51) Int. Cl.
*C25B 1/04*        (2006.01)
*C25B 11/04*     (2006.01)
(Continued)

(52) U.S. Cl.
CPC .......... *C25B 11/0452* (2013.01); *C25B 1/003* (2013.01); *C25B 1/04* (2013.01);
(Continued)

(58) Field of Classification Search
CPC ................................. C25B 1/003; C25B 1/04
(Continued)

(56) References Cited

U.S. PATENT DOCUMENTS 7,976,989 B2    7/2011 Lopez et al.
2002/0027068 A1    3/2002 Rosenblum et al.
(Continued)

FOREIGN PATENT DOCUMENTS

WO    WO-2011/094456 A1    8/2011
WO    WO 2012031357 A1 *    3/2012    ............... C10G 2/50
WO    WO-2013/160915        10/2013

OTHER PUBLICATIONS

Satsangi, V.R., et al., Chapter 13. Nanostructured α-Fe2O3 in PEC Generation of Hydrogen, John Wiley & Sons (Asia) Pte Ltd, (2009) chapter 13.*

(Continued)

*Primary Examiner* — Nicholas A Smith
(74) *Attorney, Agent, or Firm* — Schwegman Lundberg & Woessner, P.A.

(57) ABSTRACT

The present invention discloses an electrochemical process for water splitting for production of oxygen using porous $Co_3O_4$ nanorods with a considerably low overpotential and high exchange current density. The present invention further discloses a simple, industrially feasible process of for preparation of said nanostructured porous cobalt oxide catalyst thereof.

8 Claims, 2 Drawing Sheets

(51) Int. Cl.
*C25B 1/00* (2006.01)
*C25B 11/03* (2006.01)

(52) U.S. Cl.
CPC ........ *C25B 11/035* (2013.01); *C25B 11/0457* (2013.01); *Y02E 60/366* (2013.01)

(58) Field of Classification Search
USPC ........................................................ 518/709
See application file for complete search history.

(56) References Cited

U.S. PATENT DOCUMENTS

| | | | |
|---|---|---|---|
| 2004/0031692 | A1 | 2/2004 | Hardee |
| 2010/0101955 | A1* | 4/2010 | Nocera ................... C25B 1/04 204/547 |
| 2011/0127170 | A1 | 6/2011 | Gerken et al. |
| 2013/0192999 | A1* | 8/2013 | Jia .......................... C25B 1/003 205/628 |

OTHER PUBLICATIONS

"International Application No. PCT/IN2013/000279, International Preliminary Report on Patentability dated Oct. 28, 2014", 10 pgs.
"International Application No. PCT/IN2013/000279, Written Opinion dated Jul. 9, 2013", 9 pgs.
Frei, Heinz, et al., "Cobalt Oxide Nanocrystals and Artificial Photosynthesis", [online]. [retrieved on Nov. 4, 2014]. Retrieved from the Internet: <URL: http://www.science20.com/print/47560>, (Mar. 11, 2009). 3 pgs.
Jiao, Feng, et al., "Nanostructured Cobalt Oxide Clusters in Mesoporous Silica as Efficient Oxygen-Evolving Catalysts", *Angew, Chem. Int. Ed.*, 48, (2009), 1341-1844.
Kanan, Matthew W., et al., "In Situ Formation of an Oxygen-Evolving Catalyst in Neutral Water Containing Phosphate and $Co^{2+}$", *Science*, 321, (2008), 1072-1074.
Liang. Yongye, et al., "$Co_3O_4$ nanocrystals on graphene as a synergistic catalyst for oxygen reduction reaction", *Nature Materials*, 10, (2011), 780-786.
Lu, Bangan, et al., "Oxygen evolution reaction on Ni-substituted $Co_3O_4$ nanowire array electrodes", *International Journal of Hydrogen Energy*, 36(1), (2011), 72-78.
Patil, Dewyani, et al., "Highly sensitive and fast responding CO sensor based on $Co_3O_4$ nanorods", *Talanta*, 81, (2010), 37-43.
Sadiek, Ibrahim, et al., "Electrocatalytic Evolution of Oxygen Gas at Cobalt Oxide Nanoparticles Modified Electrodes", *Int. J. Electrochem. Sci.*, 7, (2012), 3350-3361.
Zhang, Hui, et al., "From cobalt nitrate carbonate hydroxide hydrate nanowires to porous $Co_3O_4$ nanorods for high performance lithium-ion battery electrodes", *Nanotechnology*, 19(3), (2008), 5 pgs.
Zhu, Ting, et al., "Shape-controlled synthesis of porous $Co_3O_4$ nanostructures for application in supercapacitors", *Journal of Materials Chemistry*, 20, (2010), 7015-7020.
"International Application No. PCT/IN2013/000279, Article 19 Amendment dated Aug. 29, 2013", (Aug. 29, 2013), 11 pgs.
"International Application No. PCT/IN2013/000279, International Search Report dated Jul. 9, 2013", (Jul. 9, 2013), 4 pgs.

\* cited by examiner

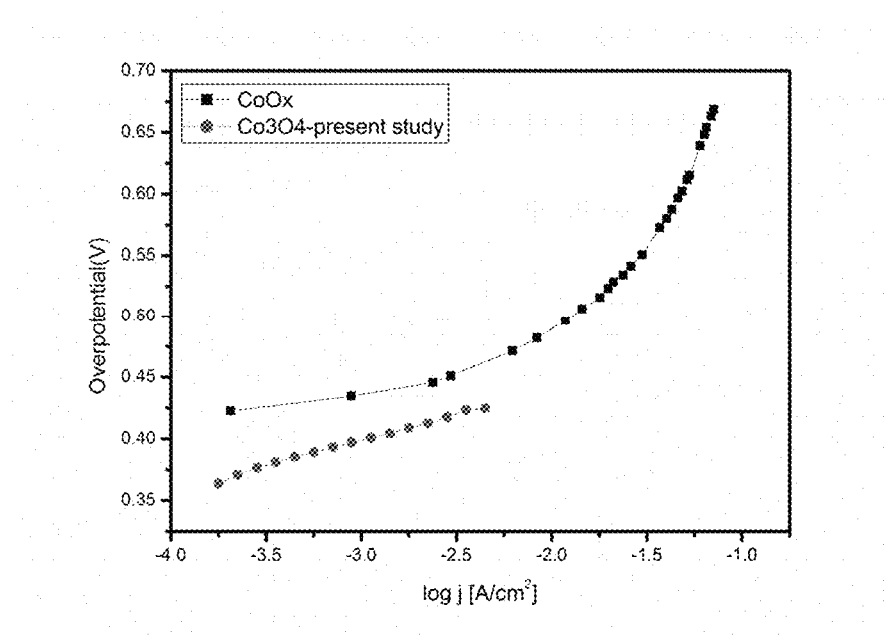
Fig: 1
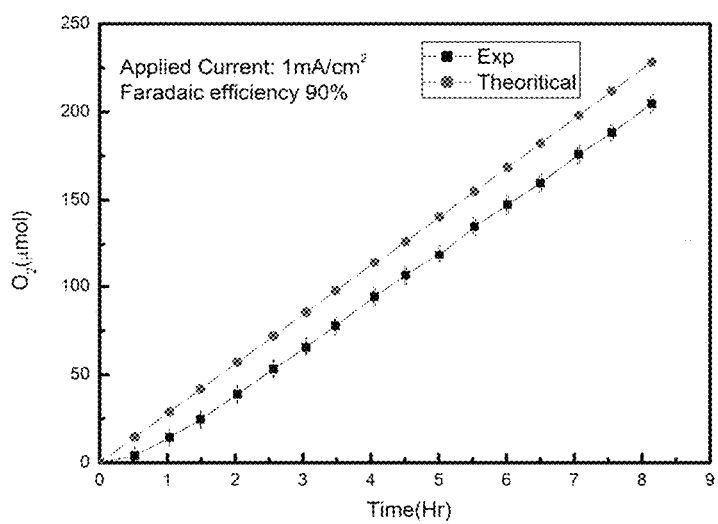
Fig: 2

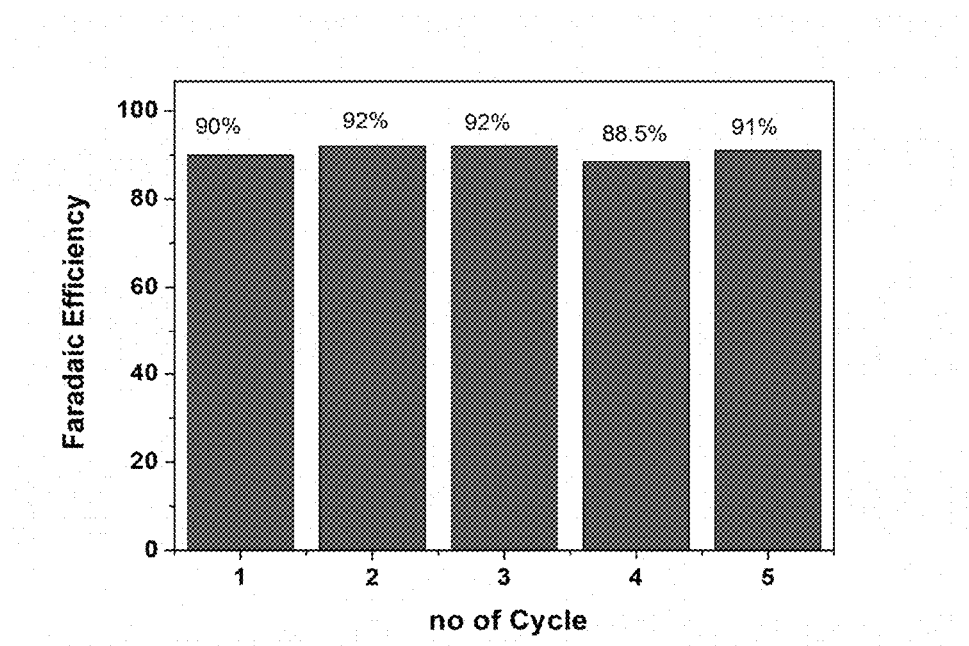
Fig: 3
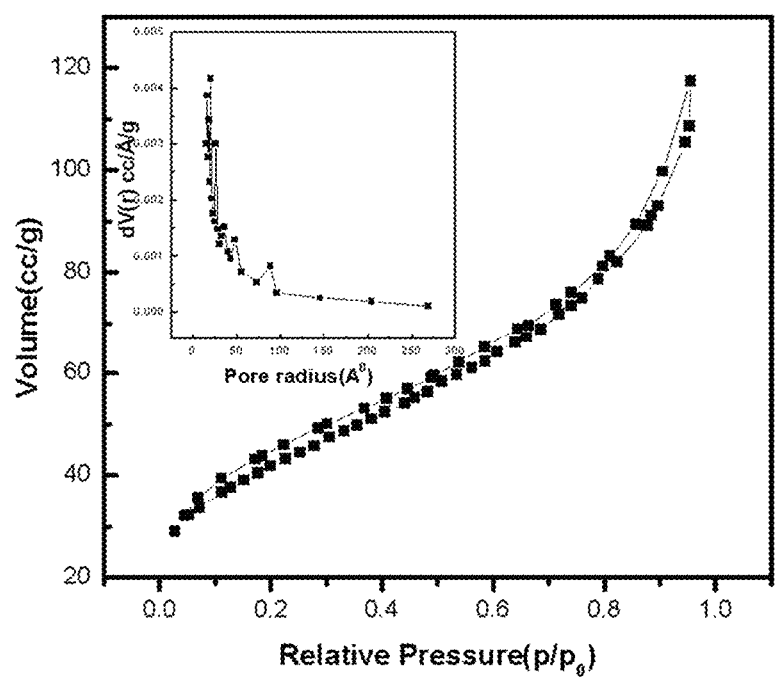
Fig: 4

ELECTROCHEMICAL PROCESS FOR WATER SPLITTING USING POROUS $Co_3O_4$ NANORODS

PRIORITY CLAIM TO RELATED APPLICATIONS

This application is a U.S. national stage application filed under 35 U.S.C. §371 from International Application Serial No. PCT/IN2013/000279, which was filed Apr. 25, 2013, and published as WO 2013/160915 on Oct. 31, 2013, and which claims priority to India Application No. 1273/DEL/2012, filed Apr. 25, 2012, which applications and publication are incorporated by reference as if reproduced herein and made a part hereof in their entirety, and the benefit of priority of each of which is claimed herein.

TECHNICAL FIELD OF INVENTION

The present invention relates to an electrochemical process for water splitting using porous $Co_3O_4$ nanorods. Particularly, the present invention relates to nanostructured porous cobalt oxide $Co_3O_4$ a catalyst for production of oxygen by electrochemical water splitting with a considerably low overpotential and high exchange current density. The present invention further relates to a simple, industrially feasible process for preparation of said nanostructured porous cobalt oxide catalyst thereof.

BACKGROUND OF THE INVENTION

For millions of years, green plants have employed photosynthesis to capture energy from sunlight and convert it into electrochemical energy. Scientists around the world are in pursuit to develop an artificial version of photosynthesis that can be used to produce fuels from carbon dioxide and water.

Increasing concentrations of greenhouse gases produced by human activities such as deforestation, burning fossil fuels and industrial revolution have contributed to global warming. Global warming is showing adverse effect on ecological, social systems and solutions are being sought by researchers to reduce the greenhouse gases and thus addressing to the problems of global warming.

One of the solutions for global warming is experimented on the usage of non-fossil fuels and production of non-fossil fuel without the emission of carbon dioxide. Hydrogen is the major non-fossil fuel which can be produced by electrochemical splitting of water without the emission of carbon dioxide. Therefore, formulation of a new electrocatalyst for electrochemical water splitting giving rise to hydrogen and oxygen is of prime interest.

Electrolytic gas production involves transfer of four protons and four electrons with the formation of an oxygen-oxygen bond at the anode concomitant with reduction of protons to produce hydrogen at the cathode. Oxygen evolution is a difficult multistep four electron transfer reaction and usually it requires higher overpotential.

Efforts have been made to try to reduce the amount of overpotential needed to drive the reaction by using specialized anodes and/or a catalyst. At present, catalysts based on Ru, Ir and Pt are used for electrochemical splitting of water, which are very costly. Also, catalysts used in prior arts are observed to degrade under reaction conditions. Cobalt oxide materials are known in the art as water-electrolysis catalysts.

An article titled "In Situ Formation of an Oxygen-Evolving Catalyst in Neutral Water Containing Phosphate and $Co^{2+}$" by Matthew W. Kanan and Daniel G. Nocera, Vol 321, Science, pg 1072-1074 disclose oxygen-evolving catalyst that forms in situ upon anodic polarization of an inert electrode in neutral aqueous phosphate solutions containing $Co^{2+}$. Oxygen generation occurs under pH=7, 1 atm, and room temperature. Cobalt ions in the presence of chemical oxidants such as $Ru(bpy)^{3+}$ (bpy, bipyridine; $E°=1.26$, where $E°$ is the standard potential) catalyze the oxidation of water to $O_2$ in neutral phosphate solutions. A Tafel plot at pH 7 is carried out and it shows overpotential of 410 mV at 1 $mA/cm^2$ current density. Extrapolation of straight line gives exchange current density of 4 to $6\times10^{-11}$ $A/cm^2$. Moreover, catalyst is synthesized by electrodeposition and it is amorphous in nature. An article titled "Cobalt Oxide Nanocrystals and Artificial Photosynthesis" by Frei and Jiao discloses rod-shaped $Co_3O_4$ crystals measuring 8 nanometers in diameter and 50 nanometers in length as photocatalysts in artificial photosynthesis. The nanorods are interconnected by short bridges to form bundled clusters which are shaped like a sphere with a diameter of 35 nanometers.

An article titled "Nanostructured cobalt oxide clusters in Mesoporous silica as efficient Oxygen-Evolving Catalyst" in Angew Chem 2009, 48, 1841-1844 relate to photocatalytic water splitting in the presence of a costly sensitizer (dye-$[Ru^{3+}(bpy)_3]/[Ru^{2+}(bpy)_3]$).

In the above mentioned prior arts discloses the use of catalyst for photocatalytic water splitting that contains Hydrogen evolution reaction (HER) and Oxygen evolution reaction (OER). The present invention is proposed to study of kinetics of oxygen evolution reaction in electrochemical method. Further, the prior arts disclose photo electrochemical measurements with sensitizer (dye).

"An article titled "Oxygen evolution reaction on Ni-substituted $Co_3O_4$ nanowire array electrodes" in International Journal of hydrogen energy, 36 (2011)72-78, reports the exchange current density of $4.7\times10^{-9}$ $A/cm^2$ for $Co_3O_4$ nanowires for oxygen evolution reaction."

US2011127170 titled "Cobalt Oxyfluoride Catalysts for Electrolytic Dissociation of Water" relates to electrodeposition of cobalt oxyfluoride. The catalyst facilitates the electrolytic conversion of water to hydrogen gas and oxygen gas at neutral pH and at room temperature. Even though it is mentioned in said patent that a neutral pH is employed, most of the experiments are carried out at pH 5. Further, the material is not stable below 1 Volt and dissolution occurs. Moreover, during prolonged electrolysis in cobalt free buffer, decrease in current is observed. To achieve steady state current, 0.1 mM $Co^{2+}$ or higher concentration of fluoride in electrolyte is needed. Also, Tafel plot and details of overpotential, exchange current density are not disclosed in the patent.

An article titled "Shape-controlled synthesis of porous $Co_3O_4$ nanostructures for application in supercapacitors by Ting Zhu, Jun Song Chen and Xiong Wen Lou et. al in J. Mater. Chem., 2010, 20, 7015-7020 reports a method for the shape-controlled synthesis of cobalt carbonate/hydroxide intermediates. Three different structures, viz., one-dimensional (1D) needle-like nanorods; two-dimensional (2D) leaf-like nanosheets, and three-dimensional (3D) oval-shaped microparticles with specific surface areas of 86.1-121.5 $m^2 g^{-1}$, are synthesized through varying experimental parameters such as precursor (cobalt acetate) concentrations and volume ratio of polyethylene glycol to water. The obtained porous $Co_3O_4$ find potential application in supercapacitors. The method of synthesis is hydrothermal and application is different from instant application.

U.S. Pat. No. 7,976,989 titled "Precious Metal Oxide Catalyst for Water Electrolysis" disclose a composite catalyst which contains precious and costly metal oxides $IrO_2$ and $RuO_2$ and high surface area inorganic oxides for use as anode catalysts in PEM (polymer electrolyte membrane) water electrolysis. The method disclosed is PEM (Polymer Electrolyte Membrane) electrolyzers for water electrolysis. The method and the composite catalyst are different from the instant invention. Further, there is no mention of overpotential required for water electrolysis.

Article titled "From cobalt nitrate carbonate hydroxide hydrate nanowires to porous $Co_3O_4$ nanorods for high performance lithium-ion battery electrodes" by Hui Zhang, Jianbo Wu, et. al in Nanotechnology Volume 19 Number 3, disclose synthesis of cobalt nitrate carbonate hydroxide hydrate $(Co(CO_3)_{0.35}(NO_3)_{0.2}(OH)_{1.1} \cdot 1.74H_2O)$ nanowires via the hydrothermal process using sodium hydroxide and formaldehyde as mineralizers at 120° C. The porous $Co_3O_4$ nanorods 10-30 nm in diameter and hundreds of nanometers in length have been fabricated from the above-mentioned multicomponent nanowires by calcination at 400° C. The method disclosed in said article is hydrothermal method for synthesis of $Co_3O_4$ nanorods. It is a complex high temperature (1200° C.) method. The said article however does not disclose BET surface area.

Article "Int. J. Electrochem. Sci., 7 (2012) 3350-3361" also used Cobalt oxide for water splitting but the material used in the article is $CoO_x$ and not $Co_3O_4$. These two materials are not same. Moreover in the article, they have synthesized $CoO_x$ by electrodeposition. However, we have followed a very simple method to synthesize $Co_3O_4$ nanorods.

In the above mentioned article, Tafel plot is not shown. Therefore, for comparison of our Tafel plot in 0.1M KOH with the reported one, we have extracted the data points from the graph in the article and Tafel plot is plotted. Both Tafel plots are compared in the FIG. 1.

FIG. 1 clearly shows that $Co_3O_4$ (present work) has less overpotential (399 mV) compared to $CoO_x$ (437 mV) at 1 $mA/cm^2$ (−3 on x-axis). In the $CoO_x$ Tafel line, after 5.6 $mA/cm^2$ (−2.25 on x-axis), the potential increases very sharply which shows that the point is the limiting current region. After that particular current density, the kinetics of reaction is governed by the mass transfer. So, usually the overpotential value should be reported at particular current density which should be less than the limiting current. In that sense, the overpotential value can be compared at 1 $mA/cm^2$ (−3 on x-axis). So at 1 $mA/cm^2$, $Co_3O_4$ has still 38 mV less overpotential compared to that reported for $CoO_x$.

As seen from above, there remains a need to develop a cost effective and efficient catalyst which catalyzes electrochemical splitting of water for production of oxygen and hydrogen at a lower overpotential and in energy efficient manner.

OBJECTIVE OF THE INVENTION

The main object of the present invention is to provide an electrochemical process for water splitting using porous $Co_3O_4$ nanorods.

Another objective of the present invention is to provide a nanostructured porous cobalt oxide $Co_3O_4$ a catalyst for production of oxygen by electrochemical water splitting with a considerably low overpotential and high exchange current density.

Another objective of the present invention is to provide a cost effective and efficient cobalt catalyst which catalyzes electrochemical splitting of water for production of oxygen at a lower overpotential and in energy efficient manner.

Another objective of the present invention is to provide a simple, industrially feasible process for the preparation of cobalt catalyst with better pore size and BET surface area.

SUMMARY OF THE INVENTION

Accordingly, the present invention provides an electrochemical process for water splitting using porous $Co_3O_4$ nanorods as anode material for production of oxygen characterized with overpotential in the range of 385 mV to 400 mV at 1 $mA/cm^2$ and exchange current density in the order of $10^{-6}$ $A/cm^2$ ($5-8 \times 10^{-6}$ $A/cm^2$) at a pH in the range of 4 to 14.

In an embodiment of the present invention an electrochemical process for water splitting using porous $Co_3O_4$ nanorods as anode material for production of oxygen, wherein the said process comprising placing an anode and cathode in an electrolyte solution comprising a mixture of water and an acid salt that is readily soluble in water in mole ratio ranging between 0.05 and 0.15 (preferably 0.1M) at pH ranging between 4-14 with overpotential in the range of 385 mV to 400 mV at 1 $mA/cm^2$ and exchange current density in the order of $10^{-6}$ $A/cm^2$ ($5-8 \times 10^{-6}$ $A/cm^2$).

In one embodiment of the present invention external source of energy is electrical energy.

In yet another embodiment, porous $Co_3O_4$ nanorods is coated on stainless steel or glassy carbon electrode as anode material.

In still another embodiment, the said catalyst have pore size ranging from 2 nm to 10 nm and BET surface area in the range of 145-155 $m^2/g$.

In still another embodiment, the said catalyst optionally comprises vulcanized carbon and Nation solution having the ratio of $Co_3O_4$:vulcanized carbon:Nafion as 7.5:2:0.5.

In still another embodiment, the faradaic efficiency of said catalyst is in the range of 85% to 95%, preferably 90%.

In still another embodiment, the acid salts are selected from potassium di-hydrogen phosphate ($KH_2PO_4$), di-potassium hydrogen phosphate ($K_2HPO_4$) either alone or in combinations thereof.

In still another embodiment, anode is selected from platinum or platinized graphitic electrodes.

DESCRIPTION OF FIGURES

FIG. 1 depicts comparison of tafel plots

FIG. 2 depicts comparison of the amount of evolved oxygen gas (in μmol) with the theoretical value and the faradaic efficiency.

FIG. 3 depicts the stability of the catalyst where the oxygen evolution measurement is done up to 5 cycles.

FIG. 4 depicts BET data and pore size distribution of $Co_3O_4$.

DETAILED DESCRIPTION OF THE INVENTION

The invention will now be described in detail in connection with certain preferred and optional embodiments, so that various aspects thereof may be more fully understood and appreciated.

Overpotential in electrolysis refers to the extra energy required than thermodynamically expected to drive a reaction. It is commonly needed when two or more molecules take part in a reaction at an electrode. Production of oxygen by oxidation of water is a complex reaction which requires a four-electron oxidation of two water molecules coupled with the removal of four protons to form a relatively weak oxygen-oxygen bond. In addition to controlling this proton-coupled electron transfer (PCET), a catalyst must tolerate prolonged exposure to oxidizing conditions. Even at the thermodynamic limit, water oxidation requires an oxidizing power that causes most chemical functional groups to degrade. Accordingly, the generation of oxygen from water presents a substantial challenge toward realizing artificial photosynthesis.

To make the process commercially practical it is important to reduce the overpotential losses during electrolysis of water and improve upon the exchange current density which is a measure of rate of reaction at equilibrium potential. Accordingly, the present invention is directed to cost effective nanostructured porous $Co_3O_4$ nanorods as anode material to produce oxygen from water efficiently at a considerable low overpotential and at a high exchange current density. Since oxygen evolution is the rate determining step in water splitting, increasing the rate of oxygen evolution ultimately increases the rate of overall water splitting. In the process, hydrogen is evolved with less amount of energy supply.

The nanostructured porous $Co_3O_4$ nanorods used, due to increase in the surface area minimizes the overpotential losses thereby enhancing the efficiency of the cell during the electrochemical splitting of water to produce oxygen.

In an embodiment, the present invention provides cost effective $Co_3O_4$ nanorods catalyst with a pore size ranging from 2 nm to 10 nm and with a BET surface area in the range of 145-155 $m^2/g$ for production of oxygen by electrochemical splitting of water at low overpotential.

The presence of the high surface area of the catalyst improves its performance and lifetime in the electrolysis reaction. Moreover, $Co_3O_4$ catalyst is inert, has very less solubility in water under experimental condition.

The anode is made from $Co_3O_4$ nanorods catalyst coated on stainless steel (SS 316) or glassy carbon electrode. The cathode is selected from platinum or platinized graphitic electrodes.

The electrolyte solution used in the instant invention is a mixture of water and an acid salt that is readily soluble in water thus improving the conductivity of water and such that the negative and the positive ions have low standard electrode potential, also acts as a buffer. The acid salt is preferably selected from potassium dihydrogen phosphate ($KH_2PO_4$), dipotassium hydrogen phosphate ($K_2HPO_4$) either alone or in combination thereof. The pH of the reaction is adjusted by adding $KH_2PO_4$, $K_2HPO_4$ or their combinations.

For pH 4, 0.1M $KH_2PO_4$ is used, for pH 7 combination of $KH_2PO_4$ and $K_2HPO_4$ (21.1 ml of 0.1M $KH_2PO_4$ and 28.9 ml of $K_2HPO_4$ diluted to 100 ml) is used.

In an embodiment, the overpotential at 1 mA using $Co_3O_4$ nanorods with phosphate buffer as electrolyte and with a pH 4 is reduced to 389 mV and with the exchange current density of $\sim 6.5 \times 10^{-6}$ $A/cm^2$.

Exchange current density is a measure of rate of reaction at equilibrium potential. In the present invention, the exchange current density observed is $10^5$ times higher the rate known in the art indicating the high reaction rate of oxygen production using nanostructured porous $Co_3O_4$ nanorods as anodic catalyst.

In a preferred embodiment, the present invention disclose a catalyst composition comprising porous cobalt oxide nanorods as anode material for production of oxygen by electrochemical splitting of water with overpotential in the range of 385 mV to 400 mV at 1 $mA/cm^2$ and exchange current density in the range of $5-8 \times 10^{-6}$ $A/cm^2$ at a pH in the range of 4 to 14.

In a preferred embodiment, the present invention discloses a catalyst composition comprising porous cobalt oxide nanorods as anode material for production of oxygen by electrochemical splitting of water with overpotential in the range of 385 mV to 400 mV at 1 $mA/cm^2$ and exchange current density in the order of $10^{-6}$ $A/cm^2$ at a pH in the range of 4 to 14.

The invention uses an external source of energy. A steady state galvanostatic method is used to construct the Tafel plot. A-constant stirring (400 rpm) is maintained throughout the experiment to avoid the contribution of current from mass transfer. IR correction is carried out manually by measuring the cell resistance before applying the current.

In another embodiment, the present invention provides a method for production of oxygen by electrochemical splitting of water characterized with overpotential in the range of 385 mV to 400 mV at 1 $mA/cm^2$ and exchange current density in the order of $10^{-6}$ $A/cm^2$ at a pH in the range of 4 to 14 comprising placing an anode and electrode in an electrolyte solution comprising a mixture of water and an acid salt that is readily soluble in water, wherein the negative and the positive ions have low standard electrode potential and also acts as a buffer and wherein the anode comprises a substrate coated with porous $Co_3O_4$ nanorods that act as catalyst; and electrochemical splitting of water for production of oxygen using an external source of energy. The faradaic efficiency of said catalyst is in the range of 85% to 95%, preferably 90%.

The electrochemical properties of the catalyst for oxygen evolution are determined from Tafel plot. The overpotential and the exchange current density are tabulated in Table 1 below:

| Material | Electrolyte | pH | Overpotential at 1 mA/cm² (mV) | At high overpotential Exchange current density(A/cm²) | Tafel slope (mV) | at low overpotential Exchange current density(A/cm²) | Tafel slope (mV) |
|---|---|---|---|---|---|---|---|
| $Co_3O_4$ nanorods | 0.1M $KH_2PO_4$ | 4 | 389 | $6.5 \times 10^{-7}$ | 122 | $6.55 \times 10^{-6}$ | 245 |
| $Co_3O_4$ nanorods | 0.1M ($KH_2PO_4$ + $K_2HPO_4$) | 7 | 385 | $4.7 \times 10^{-9}$ | 72 | $7.6 \times 10^{-6}$ | 254 |
| $Co_3O_4$ nanorods | 1M KOH | 14 | 399 | $3.62 \times 10^{-13}$ | 42 | $5.4 \times 10^{-6}$ | 249 |

-continued

| Material | Electrolyte | pH | Overpotential at 1 mA/cm² (mV) | At high overpotential | | at low overpotential | |
|---|---|---|---|---|---|---|---|
| | | | | Exchange current density(A/cm²) | Tafel slope (mV) | Exchange current density(A/cm²) | Tafel slope (mV) |
| $Co_3O_4$ Bulk | 0.1M $KH_2PO_4$ | 4 | 1470 | $1.25 \times 10^{-8}$ | 305 | — | — |

A comparison of the exchange current density and the overpotential w.r.t the prior arts are given below in Table 2:

| Material | Exchange current density | Overpotential (mV) | Reference |
|---|---|---|---|
| $Co_3O_4$ nanowires (1M NaOH) | $4.7 \times 10^{-9}$ A/cm² | The particular overpotential value is not mentioned in the publication. Only the exchange current density values are compared. Moreover, it is very difficult to compare the overpotential values of a catalyst under different experimental conditions and different substrates. In the above mentioned journal report, the substrate used is Ni foam which can go to higher current density region. The substrate used in the present work is glassy carbon electrode. | International Journal of hydrogen energy, 36 (2011) 72 |
| Cobalt based phosphate compound (pH 7) | $4-6 \times 10^{-11}$ A/cm² | 410 | Nocera et al, Science 321 (2008) 1072 |

Quantitative oxygen evolution measurement has been done to check the faradaic efficiency of the catalyst in a homemade set up. 1 mA/m² current is applied for long time. The evolved hydrogen and oxygen bubbles are separated in the home made set up. Only the oxygen bubbles are collected in the inverted measuring cylinder. The amount of evolved oxygen gas (in μmol) is compared (FIG. 2) with the theoretical value and the faradaic efficiency is calculated as 90%.

To check the stability of the catalyst, the oxygen evolution measurement is done up to 5 cycles (FIG. 3). Each cycle takes around 8 hours. The faradaic efficiency is relatively constant and dosen't change much. The stability of the catalyst is tested up to 40 hours which proves the catalyst has the capability to work in a wide range of pH (4-14) without degradation for long time.

The BET data (FIG. 4) shows good adsorption and desorption behavior. The BET surface area calculated is 150 m²/g and the pore size in the range of 2 nm to 10 nm radius.

In yet another embodiment, the present invention provides a simple process for the preparation of said nanostructured porous cobalt oxide, $Co_3O_4$. Accordingly, 0.0339M of $Co(NO_3)2.6H_2O$ and 0.0627M of $K_2CO_3$ are added drop by drop simultaneously to the RBF which contain distill water at 70° C. The pH of the solution is maintained in the range of 7-8. After completion of precipitation, the obtained precipitate is digested in the same mother liquor for 8 hours at 70° C. The obtained precipitate is washed several times with distill water to remove K⁺ ions and dried at 70° C. overnight and calcined at 300° C. to obtain $Co_3O_4$ nanorods.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive.

EXAMPLES

The following examples are given by way of illustration and therefore should not be construed to limit the scope of the present invention.

Example 1

Preparation of Catalyst $Co_3O_4$ nanorods were synthesized by simple co-precipitation method. 0.0339M of $Co(NO_3)2.6H_2O$ and 0.0627M of $K_2CO_3$ were added simultaneously drop by drop to the water (70 ml) in the RBF (round bottom flask) at 70° C. The pH of the solution was maintained at 7.5. The precipitate obtained after completion of addition was digested within the mother liquid for 8 hours. The precipitate so obtained was washed several times to remove K⁺ ions and dried at 70° C. followed by calcination of the precursor at 300° C. (3 Hrs) to obtain $Co_3O_4$ nanorods. The process for the preparation of $Co_3O_4$ nanorods is already disclosed in *Talanta*, 2010, 81, 37-43.

Example 2

Electrochemical Measurements

For all electrochemical measurements, a simple three electrode system was used. Glassy carbon was used as a working electrode. Standard calomel electrode and platinum were used as a reference and counter electrode respectively. 0.1M $KH_2PO_4$ solution was used as electrolyte for pH 4. A 0.1M mixture of $KH_2PO_4$ and $K_2HPO_4$ solution was used as electrolyte for pH 7, and 1M KOH solution was used as electrolyte for pH 14. To improve the conductivity, vulcanized carbon was added to the Co3O4 and nafion solution was added for binding purpose. The ratio of Co3O4:vulcanized carbon:nation is 7.5:2:0.5. The mixture was dispersed in isopropyl alcohol and coated on the glassy carbon electrode for electrochemical analysis.

Addition of vulcanized carbon and nafion solution (very dilute solution and not membrane) to the catalyst is the usual procedure for coating the catalyst on the electrode. It doesn't have much importance and need not be shown in the table.

The electrochemical properties of the catalyst for oxygen evolution are given below:

| Material | Electrolyte | pH | Overpotential at 1 mA/cm$^2$ (mV) | at high overpotential | | at low overpotential | |
|---|---|---|---|---|---|---|---|
| | | | | Exchange current density (A/cm$^2$) | Tafel slope (mV) | Exchange current density (A/cm$^2$) | Tafel slope (mV) |
| Co$_3$O$_4$ nanorods | 0.1M KH$_2$PO$_4$ | 4 | 389 | $6.5 \times 10^{-7}$ | 122 | $6.55 \times 10^{-6}$ | 245 |
| Co$_3$O$_4$ nanorods | 0.1M (KH$_2$PO$_4$ + K$_2$HPO$_4$) | 7 | 385 | $4.7 \times 10^{-9}$ | 72 | $7.6 \times 10^{-6}$ | 254 |
| Co$_3$O$_4$ nanorods | 1M KOH | 14 | 399 | $3.62 \times 10^{-13}$ | 42 | $5.4 \times 10^{-6}$ | 249 |
| Co$_3$O$_4$ Bulk | 0.1M KH$_2$PO$_4$ | 4 | 1470 | $1.25 \times 10^{-8}$ | 305 mV | — | — |

Advantages of the Invention

1. The present invention provides an improved nanostructured porous cobalt oxide (Co$_3$O$_4$) as catalyst in electrochemical splitting of water to produce oxygen at considerable reduced overpotential and high exchange current density.
2. Increasing exchange current density.
3. The nanostructured porous cobalt oxide (Co$_3$O$_4$) of the instant invention can be used as anode material in electrolyzers to produce oxygen efficiently at low energy supply compared to the conventional precious metal oxides.
4. Hydrogen and oxygen obtained are separate and this is an advantage over fuel cell and can decrease global warming.
5. The catalyst is prepared externally and is crystalline in nature with high surface area, BET150 m$^2$/g and the pore size in the range of 2 nm to 10 nm radius.
6. The present method for synthesis of catalyst is simple co-precipitation at 70° C. form cobalt hydroxy carbonate nanorods followed by calcination at 300° C. to obtain Co$_3$O$_4$ nanorods.

We claim:

1. An electrochemical process for water splitting using porous Co$_3$O$_4$ nanorods as anode material for production of oxygen comprising placing an anode and a cathode in an electrolyte solution comprising a mixture of water and an acid salt that is present in a concentration between 0.05 and 0.15 M at pH ranging between 4-14,
    applying a potential across the anode and cathode sufficient to produce oxygen;
    wherein the Co$_3$O$_4$ nanorods has an overpotential in the range of 385 mV to 400 mV at 1 mA/cm$^2$ and exchange current density in the order of 10$^{-6}$ A/cm$^2$ (5-8×10$^{-6}$ A/cm$^2$).

2. The electrochemical process as claimed in claim 1, wherein external source of energy used is electrical energy.

3. The electrochemical process as claimed in claim 1, wherein porous Co$_3$O$_4$ nanorods is coated on stainless steel or glassy carbon electrode as anode material.

4. The electrochemical process as claimed in claim 3, wherein porous Co$_3$O$_4$ nanorods used as catalyst have pore size ranging from 2 nm to 10 nm and BET surface area in the range of 145-155 m$^2$/g.

5. The electrochemical process as claimed in claim 1, wherein the anode material used optionally comprises vulcanized carbon and Nafion solution having the ratio of Co$_3$O$_4$:vulcanized carbon:Nafion as 7.5:2:0.5.

6. The electrochemical process as claimed in claim 1, wherein the anode material is characterized by having faradaic efficiency in the range of 85% to 95%, preferably 90%.

7. The electrochemical process as claimed in claim 1, wherein the acid salts used are selected from potassium di-hydrogen phosphate (KH$_2$PO$^4$), di-potassium hydrogen phosphate (K$_2$HPO$_4$) either alone or in combinations thereof.

8. The electrochemical process as claimed in claim 1, wherein cathode is selected from platinum or platinized graphitic electrodes.

* * * * *